(12) United States Patent
Niemoeller

(10) Patent No.: US 10,387,820 B2
(45) Date of Patent: Aug. 20, 2019

(54) METHOD AND SCORE MANAGEMENT NODE FOR SUPPORTING SERVICE EVALUATION BASED ON INDIVIDUALIZED USER PERCEPTION

(71) Applicant: Telefonaktiebolaget L M Ericsson (publ), Stockholm (SE)

(72) Inventor: Joerg Niemoeller, Sundbyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1030 days.

(21) Appl. No.: 14/611,524

(22) Filed: Feb. 2, 2015

(65) Prior Publication Data

US 2016/0224924 A1 Aug. 4, 2016

(51) Int. Cl.
*G06Q 10/06* (2012.01)
*H04L 12/24* (2006.01)
*H04L 29/08* (2006.01)

(52) U.S. Cl.
CPC ... *G06Q 10/06395* (2013.01); *H04L 41/5067* (2013.01); *H04L 67/306* (2013.01)

(58) Field of Classification Search
USPC .............................................. 705/7.11–7.42
See application file for complete search history.

(56) References Cited

U.S. PATENT DOCUMENTS 6,578,005 B1 * 6/2003 Lesaint ................. G06Q 10/06
  705/7.14
9,311,363 B1 * 4/2016 Nordstrom .......... G06F 16/9535

2006/0212359 A1 * 9/2006 Hudgeon ............. G06Q 10/063
  705/7.11
2008/0056144 A1 * 3/2008 Hutchinson ............. H04L 43/00
  370/250
2010/0268524 A1 * 10/2010 Nath ...................... H04L 67/22
  703/23

(Continued)

OTHER PUBLICATIONS

Conner, et al., "A trusted management framework for Service-Oriented Environments", Track: Web Engineering/Session: Service Oriented Development, WWW 2009 Madridi, pp. 891-900. (Year: 2009).*

*Primary Examiner* — Amber A Misiaszek
(74) *Attorney, Agent, or Firm* — Patent Portfolio Builders, PLLC

(57) ABSTRACT

A score management node identifies characteristics of a user, defines a user profile for the user which user profile comprises at least one predefined user group that matches the identified user characteristics, and sets user-specific model parameters based on the defined user profile wherein the user-specific model parameters are valid for the at least one user group in the user profile. When receiving network measurements related to service events when the service is delivered to the user, the score management node determines a quality score reflecting the user's perception of quality of service delivery and an associated significance reflecting the user's perception of importance of each service delivery, by applying the user-specific model parameters on each network measurement. The score management node then calculates the perception score based on the quality scores and associated significances, wherein the calculated perception score is made available for the service evaluation.

24 Claims, 4 Drawing Sheets

(56) References Cited

U.S. PATENT DOCUMENTS

2010/0269044 A1* 10/2010 Ivanyi .................... G06Q 30/02
715/736
2016/0048900 A1* 2/2016 Shuman ............. G06Q 30/0631
705/7.33

* cited by examiner

| Predefined user groups |||
|---|---|---|
| User group | Rules | Model parameters |
| Group 1 | age > 30 | A1, B1, C1 |
| Group 2 | age < 30 | A2, B2, C2 |
| Group 3 | Subscription plan A | |
| Group 4 | Frequent video usage | |
| Group 5 | Frequent voice call usage | |
| ... | ... | ... |

| User profile ||
|---|---|
| User group | Relevance weight, W |
| Group 2 | 1 |
| Group 4 | 0,4 |
| Group 5 | 0,2 |
| ... | ... |

METHOD AND SCORE MANAGEMENT NODE FOR SUPPORTING SERVICE EVALUATION BASED ON INDIVIDUALIZED USER PERCEPTION

TECHNICAL FIELD

The present disclosure relates generally to a method and a score management node for supporting service evaluation by obtaining a perception score P reflecting a user's experience of a service delivered by means of a telecommunication network.

BACKGROUND

When a service has been delivered by means of a telecommunication network by a service provider to one or more users, it is of interest for the service provider to know whether the user is satisfied with the delivered service or not, e.g. to find out if the service has shortcomings that need to be improved in some way to make it more attractive to this user and to other users. Service providers, e.g. network operators, are naturally interested in making their services as attractive as possible to users in order to increase sales, and a service may therefore be designed and developed so as to meet the users' demands and expectations as far as possible. It is therefore useful to gain knowledge about the users' opinion after service delivery in order to evaluate the service. The services discussed in this disclosure may, without limitation, be related to streaming of audio and visual content e.g. music and video, on-line games, web browsing, file downloads, voice and video calls, delivery of information e.g. in the form of files, images and notifications, and so forth, i.e. any service that can be delivered by means of a telecommunication network.

A normal way to obtain the users' opinion about a delivered service is to explicitly ask the customer, after delivery, to answer certain questions about the service in a survey or the like. For example, the service provider may send out or otherwise present an inquiry form, questionnaire or opinion poll to the customer with various questions related to user satisfaction of the service and its delivery. If several users respond to such a poll or questionnaire, the results can be used for evaluating the service, e.g. for finding improvements to make, provided that the responses are honest and that a significant number of users have answered. An example of using survey results for estimating the opinion of users is the so-called Net Promoter Score, NPS, which is calculated from answers to user surveys to indicate the users' collected opinions expressed in the survey answers.

However, it is often difficult to motivate a user to take the time and trouble to actually answer the questions and send a response back to the service provider. Users are often notoriously reluctant to provide their opinions on such matters, particularly in view of the vast amounts of information and questionnaires flooding users in the current modern society. One way to motivate the user is to reward him/her in some way when submitting a response, e.g. by giving some present or a discount either on the purchased services or when buying future services, and so forth.

Even so, it is a problem that surveys can in practice only be conducted for a limited number of users which may not be representative for all users of a service, and that the feedback cannot be obtained in "real-time", that is immediately after service delivery. A survey should not be sent to a user too frequently either. The obtained feedback may thus get out-of-date.

Further problems include that considerable efforts must be spent to distribute a survey to a significant but still limited number of users and to review and evaluate all answers coming in, sometimes with poor results due to low responsiveness. Furthermore, the user may provide opinions which are not really honest and responses to surveys may even be misleading. For example, the user is often prone to forget how the service was actually perceived or experienced when it was delivered, even after a short while, once prompted to respond to a questionnaire. Human memory thus tends to change over time, and the response given may not necessarily reflect what the user really felt and thought at service delivery. The user may further provide the response very hastily and as simply as possible not caring much if it really reflects their true opinion. The opinion expressed may also be dependent on the user's current mood such that different opinions may be expressed at different occasions, making the response all the more erratic and unreliable.

Still another problem is that it can be quite difficult to trace an underlying reason why users have been dissatisfied with a particular service, so as to take actions to eliminate the fault and improve the service and/or the network used for its delivery. Tracing the reason for such dissatisfaction may require that any negative opinions given by users need to be correlated with certain operational specifics related to network performance, e.g. relating to where, when and how the service was delivered to these users. This kind of information is not generally available and analysis of the network performance must be done manually by looking into usage history and history of network issues. Much efforts and costs are thus required to enable tracing of such faults and shortcomings.

SUMMARY

It is an object of embodiments described herein to address at least some of the problems and issues outlined above. It is possible to achieve this object and others by using a method and a score management node as defined in the attached independent claims.

According to one aspect, a method is performed by a score management node for supporting service evaluation by obtaining a perception score P for a user reflecting the user's experience of a service delivered by means of a telecommunication network. In this method the score management node identifies characteristics of the user, defines a user profile for the user which user profile comprises at least one predefined user group that matches the identified user characteristics, and sets user-specific model parameters based on the defined user profile wherein the user-specific model parameters are valid for the at least one user group in the user profile.

When receiving network measurements related to service events when the service is delivered to the user, the score management node determines, for each network measurement, a quality score Q reflecting the user's perception of quality of service delivery and an associated significance S reflecting the user's perception of importance of the service delivery, by applying the user-specific model parameters on said network measurement. The score management node then calculates the perception score P based on the quality scores Q and associated significances S, wherein the calculated perception score P is made available for the service evaluation.

According to another aspect, a score management node is arranged to support service evaluation by obtaining a perception score P for a user reflecting the user's experience of a service delivered by means of a telecommunication network. The score management node comprises a processor and a memory containing instructions executable by the processor, whereby the score management node is configured to:

identify characteristics of the user, define a user profile for the user, the user profile comprising at least one predefined user group that matches the identified user characteristics, set user-specific model parameters based on the defined user profile wherein the user-specific model parameters are valid for the at least one user group in the user profile, receive network measurements related to service events when the service is delivered to the user, determine, for each network measurement, a quality score Q reflecting the user's perception of quality of service delivery and an associated significance S reflecting the user's perception of importance of the service delivery, by applying the user-specific model parameters on said network measurement, and calculate the perception score P based on the quality scores Q and associated significances S, wherein the calculated perception score P is made available for the service evaluation.

Thereby, the perception score P can be used in the service evaluation as an estimation of this particular users' opinion as P is dependent on the user's characteristics, and it is possible to obtain P automatically after every time a service is delivered to the user. Further, the perception score P is calculated from technical measurements in the network related to the service usage which are readily available for any user and it is thus not necessary to depend on the user to answer a survey or the like.

The above method and score management node may be configured and implemented according to different optional embodiments to accomplish further features and benefits, to be described below.

A computer program storage product is also provided comprising instructions which, when executed on at least one processor in the score management node, cause the at least one processor to carry out the method described above for the score management node.

BRIEF DESCRIPTION OF DRAWINGS

The solution will now be described in more detail by means of exemplary embodiments and with reference to the accompanying drawings, in which.

DETAILED DESCRIPTION

Figure 1:
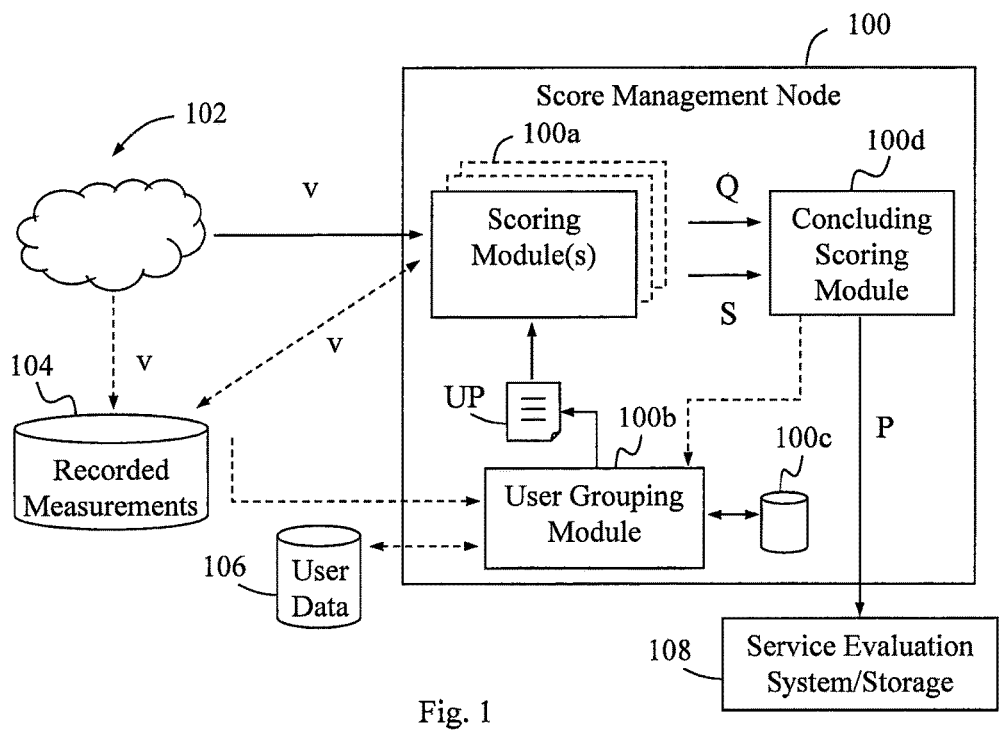
FIG. 1 is a block diagram illustrating an example of how a score management node may be configured and operate, according to some possible embodiments.

The embodiments described in this disclosure can be used for supporting evaluation of a service by obtaining an estimated user opinion about the service when it has been delivered to a specific user by means of a telecommunication network. The embodiments will be described in terms of functionality in a "score management node". Although the term score management node is used here, it could be substituted by the term "score management system" throughout this disclosure.

Briefly described, a perception score P is calculated that reflects the user's experience of the service, based on technical network measurements made for events or occasions when the service was delivered to the user, hereafter referred to as "service events" for short, which measurements are received by the score management node. For example, the network measurements may relate to the time needed to download data, the time from service request until delivery, call drop rate, data rate and data error rate.

In this solution it has been recognized that two users may perceive the same service delivery in different ways depending on certain user-specific factors and circumstances, even if the service delivery has produced identical network measurements for both users, which will be described below. It has further been recognized that users with different characteristics may have correspondingly different expectations of a service depending on their characteristics and previous experiences. This solution may be used for obtaining a user-specific perception score P which has been adapted according to a particular user's characteristics.

In the following description, any network measurements related to delivery of a service to the user by means of a telecommunication network are generally denoted "v" regardless of measurement type and measuring method. It is assumed that such network measurements v are available in the network, e.g. as provided from various sensors, probes and counters at different nodes in the network, which sensors, probes and counters are already commonly used for other purposes in telecommunication networks of today, thus being operative to provide the network measurements v used by the score management node in this solution. Key Performance Indicator, KPI, is a term often used in this field for parameters that in some way indicate network performance, and the network measurements mentioned in this disclosure may comprise such KPIs.

Further, the term "delivery of a service by means of a telecommunication network" may be interpreted broadly in the sense that it may also refer to any service delivery that can be recorded in the network by measurements that somehow reflect the user's experience of the service delivery. Some further examples include services provided by operator personal aided by an Operation and Support System, OSS, infrastructure. For example, "Point of sales" staff may be aided by various software tools for taking and executing orders from users. These tools may also be able to measure KPIs related to performance of the services.

Another example is the Customer Care personal in call centers who are aided by some technical system that registers various user activities. Such technical systems may as well make network measurements related to these activities as input to the score management node.

For example, the network measurements v may be sent regularly from the network to the score management node, e.g. in a message using the hyper-text transfer protocol http or the file transfer protocol ftp over an IP (Internet Protocol) network. Otherwise the score management node may fetch the measurements v from a measurement storage where the network stores the measurements. In this disclosure, the term network measurement v may also refer to a KPI which is commonly prepared by the network to reflect actual physical measurements. The concept of KPIs is well-known as such in telecommunication networks.

The perception score P is generated by the score management node as follows and with reference to FIG. 1 which illustrates a score management node 100 which receives network measurements v made in a telecommunication network 102 as related to service events when the service is delivered to the user U. The network measurements v may be sent from the network 102 to the score management node 100 more or less in real-time in a "live stream" fashion as the service events occur, e.g. from an Operation & Maintenance, O&M, node or similar, not shown. Alternatively, the network measurements v may be recorded by the network 102 and stored in a suitable storage or database 104, as indicated by a dashed one-way arrow from the network 102, which information can be accessed by the score management node 100, e.g. at regular intervals, as indicated by a dashed two-way arrow.

The received network measurements v can be seen as "raw data" being used as input in this procedure. For example, the above O&M node may be an aggregation point or node for distributed sensors and probes that make measurements in the traffic flows throughout the network. This node may combine, correlate and potentially filter the measurement data, e.g. to produce KPIs or the like.

A quality score Q reflecting the user's perception of quality of a delivered service and an associated significance S reflecting the user's perception of importance of the delivered service, are determined for each network measurement by a scoring module 100a, based on an individual user profile UP of the user and the respective network measurement. The user profile is based on characteristics of the user which may influence how the user perceives the service, and it is a factor that will influence the resulting perception score P. The score management node 100 may comprise other scoring modules 100a as well for adjusting Q and S depending on other influencing factors, which is however outside the scope of this solution.

The user profile UP is defined by a user grouping module 100b as comprising at least one predefined user group that matches characteristics of the user, thus indicating that the user is qualified as a member of the user group(s) in the user profile. 100c denotes a storage that holds the predefined user groups which can be accessed by the user grouping module 100b. Further, 106 denotes a storage that holds user data from which the user grouping module 100b may obtain the user's characteristics as indicated by another dashed two-way arrow. The storage 106 for user data may be maintained by the network 102.

Q and S may be determined by applying predefined functions on the network measurements, which will be explained in more detail later below. In short, these functions comprise certain user-specific model parameters which are set based on the user profile UP defined for the user. Q and S are calculated by using the user-specific model parameters in the predefined functions which are applied on each network measurement.

The perception score P of the received network measurements v is then derived from the quality scores Q which are weighted by their associated significances S, and P is calculated by a "concluding scoring module" 100d thus using the outcome from scoring module 100a. Basically, the greater significance S the greater influence has the associated quality score Q on the resulting perception score P.

Having generated the resulting perception score P, the score management node 100 makes P available for evaluation of the service, e.g. by saving it in a suitable storage or sending it to a service evaluation system or center, schematically indicated by numeral 108. For example, P may be sent to the service evaluation system or storage 108 in an http message or an ftp message over an IP network. The service evaluation system or storage 108 may comprise an SQL (Structured Query Language) database or any other suitable type of database.

By using the individual user profile as a basis for determining the quality score Q and associated significance S, the perception score P is made user-specific, i.e. reflecting how this particular user has perceived the service. This disclosure is directed to describe how the individual user profile can be defined and how the above user-specific perception score P can be obtained by using the individual user profile as a basis, among other things, according to some illustrative but non-limiting examples and embodiments. By using this solution, the perception score P can be seen as a model for how a specific user is expected to perceive the service given the user's likely expectations of the delivered service, which model is based on objective and technical network measurements. Thus, P is effectively an individualized quantification of the user's assumed perception of the service delivery.

There are several advantages of this solution as compared to conventional ways of obtaining a user's expected opinion about a service. First, the perception score P is a quite accurate estimation of this particular users' opinion of the service event considering that user's characteristics, and it is possible to obtain P automatically and continuously in real-time for any user, basically after every time a service is delivered to a user. There are thus no restrictions regarding the number of users nor the extension of time which makes it possible to obtain a quite representative perception score P that is adapted and valid for each specific user, i.e. individualized.

Second, the perception score P is calculated from technical measurements in the network related to the service usage which are truthful and "objective" as such, also being readily available, thereby avoiding any dependency on the user's memory and willingness to answer a survey or the like. Third, it is not necessary to spend time and efforts to distribute surveys and to collect and evaluate responses, which may require at least a certain amount of manual work.

Fourth, it is also possible to gain further knowledge about the service by determining the perception score P selectively, e.g. for specific types of services, specific types of network measurements, specific users or categories of users, and so forth. Fifth, it is also possible to trace a technical issue that may have caused a "bad" experience of a delivered service by identifying which measurement(s) have generated a low perception score P. It can thus be determined when and how a service was delivered to a presumably dissatisfied user, as indicated by the perception score P, and therefore a likely technical shortcoming that has caused the user's dissatisfaction can also be more easily identified. Once found, the technical issue can easily be eliminated or repaired. Different needs for improvement of services can also be prioritized based on the knowledge obtained by the perception score P. Further features and advantages will be evident in the description of embodiments that follows.

Figure 2:
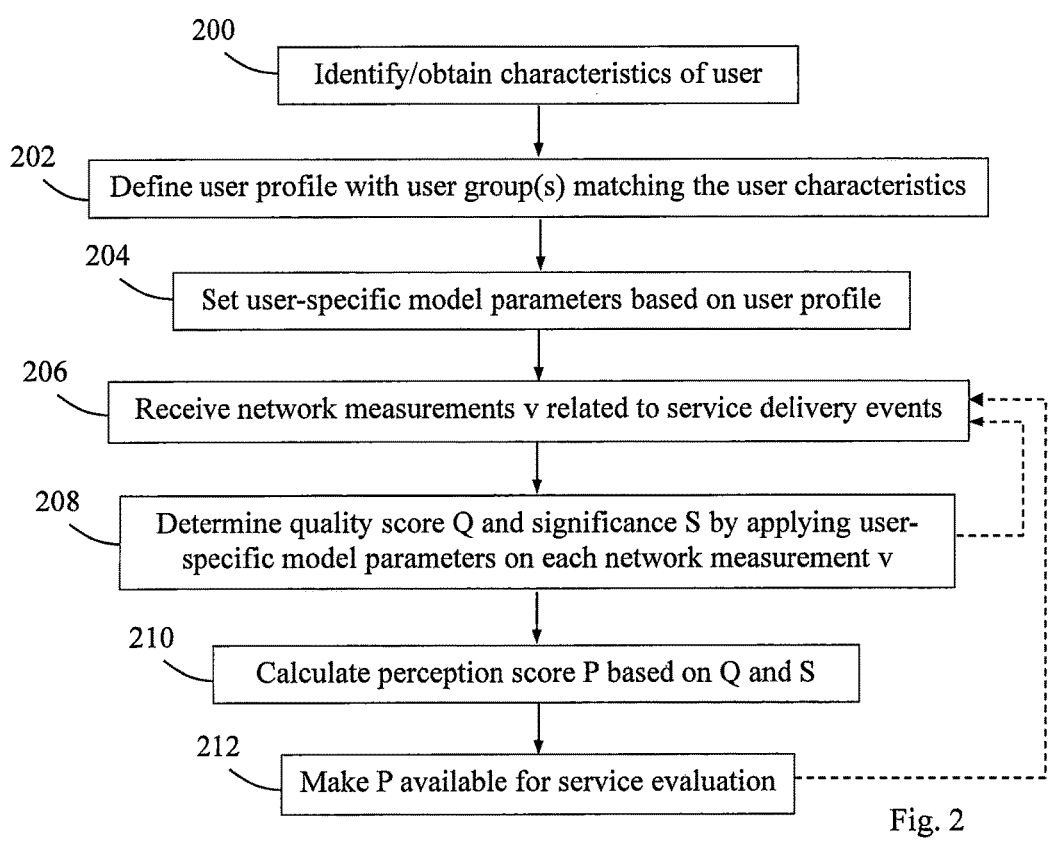
FIG. 2 is a flow chart illustrating a procedure in a score management node, according to further possible embodiments.

An example of how the solution may be employed will now be described with reference to the flow chart in FIG. 2 which illustrates a procedure with actions performed by a score management node, to accomplish the functionality described above. The score management node is operative to support service evaluation based on a perception score P reflecting a user's experience of a service delivered by means of a telecommunication network, e.g. in the manner described above for the score management node 100. In particular, this procedure produces an individualized perception score P that is adapted to the user's characteristics and assumed expectations.

A first action 200 illustrates that the score management node identifies or obtains characteristics of the user. For example, these characteristics may, without limitation, comprise demographical factors like age, gender and married or not, and also profession, subscription specifics, location of residence and location of working site. This type of information may be obtained from a user database or the like which may be maintained by the network. The user's characteristics may also relate to his/her previous service usage by means of the telecommunication network which can easily be registered by the network and obtained therefrom by the score management node in a suitable manner. For example, the user may be classified as using a particular service frequently, moderately or rarely.

In a next action 202, the score management node defines a user profile for the user, which user profile comprises at least one predefined user group that matches the identified or obtained user characteristics. This action may be performed as follows. It was mentioned above that a selection of user groups have been predefined for use in this solution, and that these groups may be maintained in a storage 100c accessed by a user grouping module 100b. In a possible embodiment, the score management node may identify the at least one matching user group when the user characteristics obtained in action 200 satisfy one or more rules defined for the user group(s). In this way, the score management node is able to define the user profile for the user based on his/her user characteristics.

In another possible embodiment, the one or more rules of each predefined user group may dictate that the user characteristics must satisfy one or more predefined threshold conditions in order to include said user group in the user profile, which thus implies that the user group matches the user's characteristics. In further possible embodiments, the one or more rules of the above embodiments may be related to at least one of:
   A) Demographical factors, i.e. age, gender and/or married or not.
   B) The user's profession, which may be defined in different ways e.g. in terms of field of industry or operation, or as a title or role in an organization or company such as management, economics, administration, technical staff, and so forth.
   C) Location of the user's residence, which may be defined with suitable detail, e.g. province, county, city, local district, etc.
   D) Location of the user's working site, which may be defined as above.
   D) The user's previous service usage, e.g. indicating how much the user has employed a service before, which has been explained above.

As mentioned above, the score management node thus investigates whether the user's characteristics fulfil the rules as defined by any of above factors, for finding any matching predefined user group to include in the user profile.

In a further action 204, the score management node then sets user-specific model parameters based on the defined user profile wherein the user-specific model parameters are valid for the at least one user group in the user profile. The user-specific model parameters will be used when determining Q and S once a service event has occurred. Thus, one or more model parameters have been predefined for each predefined user group which can be used as a basis for obtaining a perception score that is adapted for that user group. If the user profile comprises just one single user group, e.g. depending on the outcome of the above-described rules, the user-specific model parameters of action 204 comprises only the predefined model parameters from that user group.

Further, if the user profile comprises more than one user group, the user-specific model parameters should be a combination of the predefined model parameters from all those user groups in the user profile. In a possible embodiment, when the user profile comprises at least two predefined user groups, the score management node may thus set the user-specific model parameters by combining, or "aggregating", predefined model parameters of each user group in the user profile. The user-specific model parameters of this action are thereby part of the defined user profile.

It will now be described in more detail how the user-specific model parameters can be determined for an individual user profile through predefined user groups. As indicated above, model parameters have been predefined for a typical user of each predefined user group. This may be used in two fundamentally different ways as follows.
   1) A combined set of model parameters is calculated from the predefined model parameters selected from all user groups the user is member of. This may for example be done by averaging the model parameters of all matching user groups. It is also possible to determine a weighted average depending on the "degree of group membership", because there could be gradual degree of membership depending on how relevant each user group is to the user which may be determined from the user's characteristics in view of the user group's rules.
   2) Another way is that no user-specific set of model parameters is determined. Instead, the perception score P is determined per user group by using the predefined model parameters of all user groups the user is member of. This creates a number of partial group-specific perception scores P, i.e. one for each user group. The individualized user-specific perception score P may then finally be calculated by combining the partial ones. The partial group-specific perception scores P may be weighted depending on the degree of group membership, which will be described in more detail later below.

By the above actions 200-204, the score management node has determined which user-specific model parameters are valid for this particular user which thus can be used for determining the individualized perception score P of the user once a network measurement of a service event for this particular user is received from the network. Actions 200-204 may be performed once and for all, or at regular intervals to update the user profile in case the user's characteristics have changed. For example, actions 200-204 may be performed after a certain number of service events have occurred for the user, or when a change of characteristics is detected that impacts the user's group membership and/or the relevance of the user group(s) in the user profile.

Another action 206 illustrates that the score management node receives network measurements related to service events when the service is delivered to the user. Thus, a network measurement is received basically each time the service is delivered to the user. This action thus refers to several service events. This operation may be performed in different ways, e.g. when the network sends a stream of network measurements as they are generated, or by fetching network measurements from a measurement storage, as described above. Action 206 may thus be executed continuously or regularly any time during the course of this process of the following actions. The protocol used in this communication may be the hyper-text transfer protocol http or the file transfer protocol ftp, and the network measurements may be received in a message such as a regular http message or ftp message.

In some possible embodiments, the score management node may thus receive the network measurements in a message according to the hyper-text transfer protocol http or the file transfer protocol ftp. In some further possible but non-limiting embodiments, the network measurements may be related to any of: the time needed to download data, the time from service request until delivery, call drop rate, data rate, and data error rate.

In a next action 208, the score management node determines, for each network measurement, a quality score Q reflecting the user's perception of quality of service delivery and an associated significance S reflecting the user's perception of importance of the service delivery, by applying the user-specific model parameters on said network measurement.

It was described above that Q and S may be determined by applying predefined functions comprising the user-specific model parameters on each respective network measurement v. For example, Q may be determined by applying a first predefined function Q(v) on the network measurement v, and S may be determined by applying a second predefined function S(v) on the network measurement v. The first and second functions are thus different functions configured to produce suitable values of Q and S, respectively. The first and second predefined functions Q(v) and S(v) may be comprised in the user profile.

Further, the first and second predefined functions Q(v) and S(v) are dependent on a type of the network measurement so that a function applied on, say, measurement of data rate is different from a function applied on measurement of call drop rate, to mention two non-limiting but illustrative examples. In this way, a pair of Q and associated S is obtained for each network measurement of a service event. A dashed arrow indicates that actions 206 and 208 may thus be repeated whenever a network measurement is received for a service event. The user-specific model parameters are thus comprised in the functions Q(v) and S(v) thereby making the resulting values of Q and S valid for this particular user, i.e. user-specific.

In a further action 210, the score management node calculates the perception score P based on the quality scores Q and associated significances S determined in the previous action 208, wherein the calculated perception score P is made available for the service evaluation as shown by a final action 212. In a possible embodiment, the score management node may determine multiple pairs of the quality score Q and associated significance S for the respective service events based on the network measurements, and calculates the perception score P as an average of the quality scores Q for the service events weighted by their associated significances S.

In a further possible embodiment, when N pairs of Q and S have been determined, the score management node may calculate the perception score $P_N$ for the N network measurements as $$P_N = \frac{\sum_{n=1}^{N} Q_n S_n}{\sum_{n=1}^{N} S_n}$$

where $Q_n$ is the quality score for each network measurement n and $S_n$ is the associated significance for said network measurement n.

The calculated perception score P may be made available for use in the service evaluation in action 212 by sending P to a suitable service evaluation system or storage, e.g. as indicated by numeral 108 in FIG. 1. The protocol used in this communication may be e.g. the hyper-text transfer protocol http or the file transfer protocol ftp, and the perception score P may be sent to the service evaluation system or storage in an http message or an ftp message over an IP network. The service evaluation system or storage may comprise an SQL (Structured Query Language) database or any other suitable type of database. After P has been calculated and made available in action 212, the score management node may continue to receive further network measurements and repeat actions 206-212, as indicated by another dashed arrow.

It was mentioned above that partial group-specific perception scores P may be weighted depending on the degree of group membership, i.e. how relevant the user group is to the user according to his/her characteristics, hence the term "relevance weight" used here.

In another possible embodiment, the score management node may include multiple user groups that match the identified user characteristics in the user profile, determine a partial perception score P for each user group separately, and determine a "total" perception score P by applying a respective relevance weight on each determined partial perception score P, wherein the relevance weight of each user group in the user profile is dependent on how relevant the user group is for the user.

In a possible alternative embodiment, when multiple user groups that match the identified user characteristics are included in the user profile as above, the score management node may determine a group-specific quality score Q and associated significance S for each user group separately, and determine a "total" quality score Q and associated significance S by applying a respective relevance weight on each determined group-specific quality score Q and associated significance S, wherein the relevance weight of each user group in the user profile is dependent on how relevant the user group is for the user.

Figures 3, 4, 5:
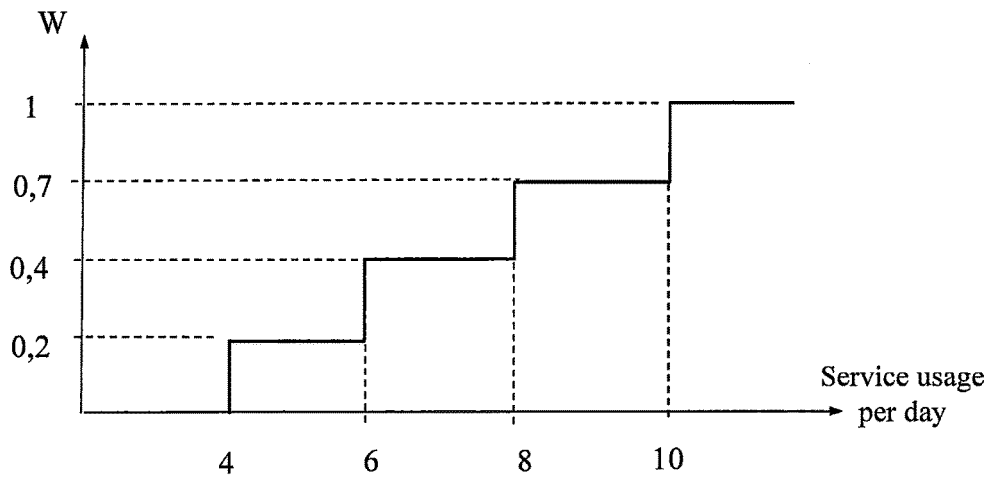
FIG. 3 is a table illustrating some examples of predefined user groups, according to further possible embodiments.
FIG. 4 is another table illustrating an example of a user profile, according to further possible embodiments.
FIG. 5 is a diagram illustrating an example of how a relevance weight W may be dependent on service usage, according to further possible embodiments.

FIG. 3 is a table containing some illustrative but non-limiting examples of predefined user groups 1-5 and rules for determining if the groups match a user or not. This kind of table may be maintained in the storage 100c in the example of FIG. 1. User group 1 is defined for users older than 30 while user group 2 is defined for users younger than 30. Group 3 is defined for users subscribing to a certain subscription plan "A". Groups 4 and 5 are defined by service usage where group 4 is defined for users frequently using video services and group 5 is defined for users frequently using voice call services. As mentioned above the functions Q(v) and S(v) comprise model parameters and these model parameters may be group specific. For example Q(v) may be defined for a particular measurement type as $$Q(v)=Av^2+Bv+C$$

A, B and C are examples of such model parameters in the function Q(v), which may thus be different for different user groups.

FIG. 4 is another table illustrating an exemplary user profile with user groups and relevance weights which profile may be determined for a user from the user's characteristics by comparing them to the rules of each respective user group in FIG. 3. This user is less than 30 years old and thus belongs to group 2 with a relevance weight of 1. The user also uses the video service of group 4 moderately, e.g. once or twice a day. Therefore, the relevance weight of group 4 is 0.4. Further, the user also uses the voice call service of group 5 quite rarely, e.g. just once or twice a week. Therefore, the relevance weight of group 5 is 0.2. The relevance weights in FIG. 4 may then be used for determining a perception score P for the user, either by applying respective weights on partial perception scores P determined for each user group, or by applying respective weights on Q and S determined for each user group, in accordance with the two latter embodiments described above, respectively.

FIG. 5 is a diagram illustrating an example of how the relevance weight W may be defined dependent on service usage, e.g. for one of groups 4 and 5 of FIG. 3. In this example, the relevance weight W is zero for a certain service usage less than 4 times a day, W is 0.2 for service usage of 4 and 5 times a day, W is 0.4 for service usage of 6 and 7 times a day times a day, W is 0.7 for service usage of 8 and 9 times a day, and W is 1 for service usage of 10 times and more a day. The examples of groups 1, 2 and 3 in FIG. 3 may not have any relevance weights defined since a user cannot match these groups to different degrees, it is either yes or no. However, if group 1 and 2 would instead be defined with rules "young user" and "old user", respectively, relevance weights would be more apt to use.

Figure 6:
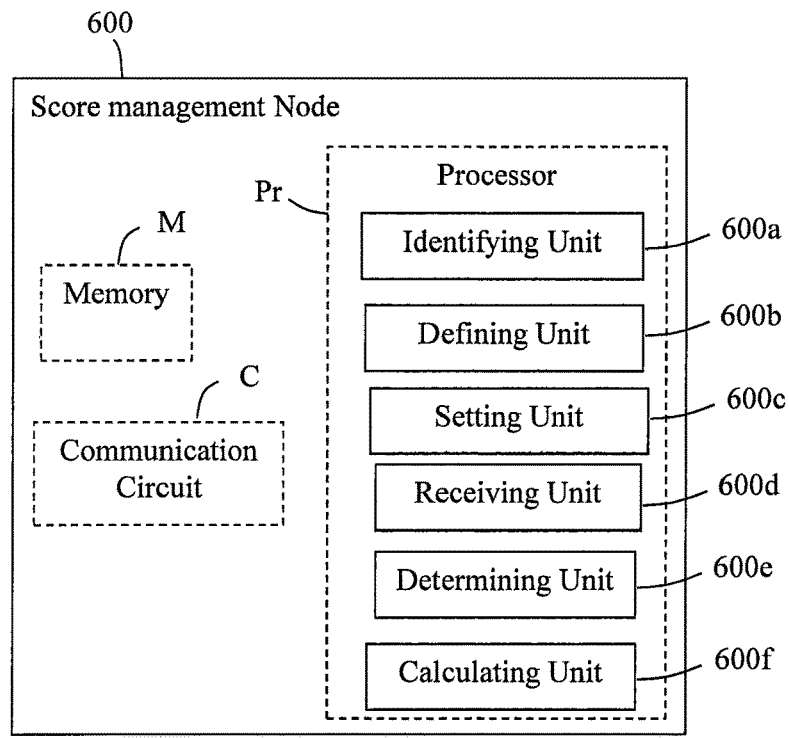
FIG. 6 is a block diagram illustrating an example of how a score management node may be configured, according to further possible embodiments.

The block diagram in FIG. 6 illustrates another detailed but non-limiting example of how a score management node 600 may be structured to bring about the above-described solution and embodiments thereof. In this figure, the score management node 600 may thus be configured to operate according to any of the examples and embodiments of employing the solution as described above, where appropriate, and as follows. The score management node 600 in this example is shown in a configuration that comprises a processor "Pr", a memory "M" and a communication circuit "C" with suitable equipment for receiving and transmitting information and data in the manner described herein.

The communication circuit C in the score management node 600 thus comprises equipment configured for communication with a telecommunication network, not shown, using one or more suitable communication protocols such as http or ftp, depending on implementation. As in the examples discussed above, the score management node 600 may be configured or arranged to perform at least the actions of the flow chart illustrated in FIG. 2 in the manner described above. These actions may be performed by means of functional units in the processor Pr in the score management node 600 as follows.

The score management node 600 is arranged to support service evaluation based on a perception score P reflecting a user's experience of a service delivered by means of a telecommunication network. The score management node 600 thus comprises the processor Pr and the memory M, said memory comprising instructions executable by said processor, whereby the score management node 600 is operable as follows.

The score management node 600 is configured to identify characteristics of the user. This identifying operation may be performed by an identifying unit 600a in the score management node 600, e.g. in the manner described for action 200 above. The score management node 600 is also configured to define a user profile for the user, the user profile comprising at least one predefined user group that matches the identified user characteristics. This defining operation may be performed by a defining unit 600b in the score management node 600, e.g. in the manner described for action 202 above.

The score management node 600 is further configured to set user-specific model parameters based on the defined user profile wherein the user-specific model parameters are valid for the at least one user group in the user profile. This setting operation may be performed by a setting unit 600c in the score management node 600, e.g. in the manner described for action 204 above. The score management node 600 is further configured to receive network measurements related to at least one service event when the service is delivered to the user. This receiving operation may be performed by a receiving unit 600d in the score management node 600, e.g. in the manner described for action 206 above.

The score management node 600 is also configured to determine, for each network measurement, a quality score Q reflecting the user's perception of quality of service delivery and an associated significance S reflecting the user's perception of importance of the service delivery, by applying the user-specific model parameters on said network measurement. This determining operation may be performed by a determining unit 600e in the score management node 600, e.g. in the manner described for action 208 above. The score management node 600 is configured to calculate the perception score P based on the quality scores Q and associated significances S, wherein the calculated perception score P is made available for the service evaluation. This calculating operation may be performed by a calculating unit 600f in the score management node 600, e.g. in the manner described for action 210 above.

It should be noted that FIG. 6 illustrates some possible functional units in the score management node 600 and the skilled person is able to implement these functional units in practice using suitable software and hardware. Thus, the solution is generally not limited to the shown structure of the score management node 600, and the functional units 600a-f may be configured to operate according to any of the features described in this disclosure, where appropriate.

The embodiments and features described herein may thus be implemented in a computer program storage product comprising instructions which, when executed on at least one processor, cause the at least one processor to carry out the above actions e.g. as described for any of FIGS. 1-8. Some examples of how the computer program and the carrier can be realized in practice are outlined below, and with further reference to FIG. 6.

The processor Pr may comprise a single Central Processing Unit (CPU), or could comprise two or more processing units. For example, the processor Pr may include a general purpose microprocessor, an instruction set processor and/or related chips sets and/or a special purpose microprocessor such as an Application Specific Integrated Circuit (ASIC). The processor Pr may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the score management node 600.

Figure 7:
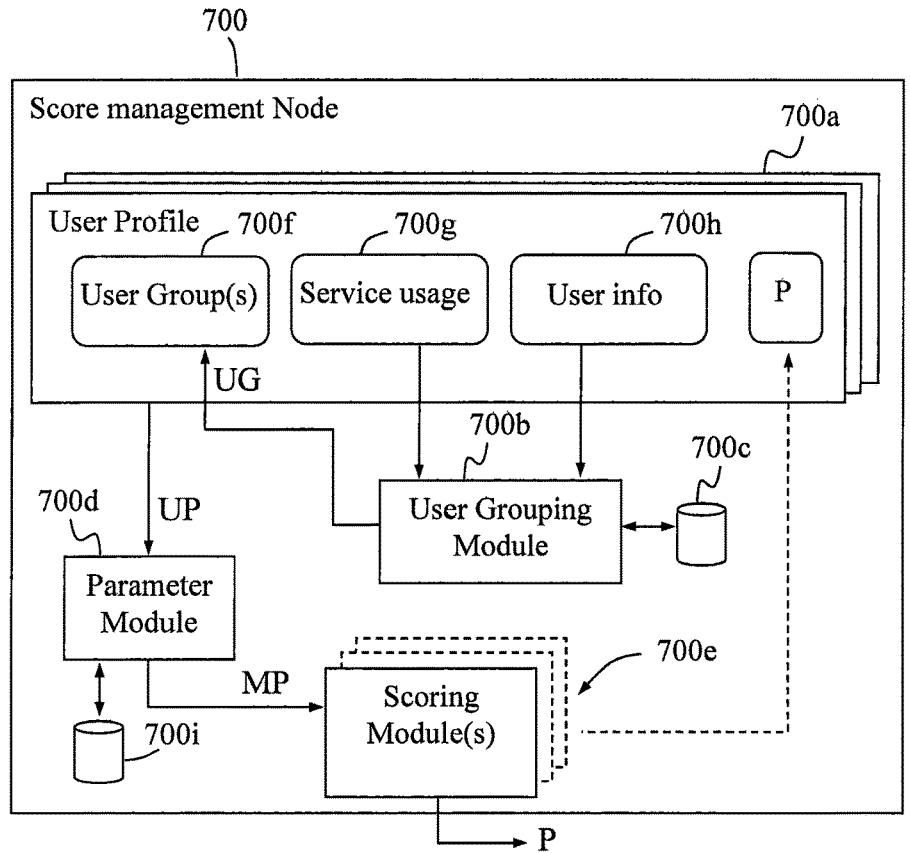
FIG. 7 is a block diagram illustrating an example of how a score management node may be configured and operate in practice, according to further possible embodiments.

FIG. 7 illustrates another example of how the above-described score management node may be configured and operate. The score management node 700 in this example maintains user profiles 700a for a number of users, e.g. users which are subscribers in a telecommunication network, not shown. Each user profile 700a contains the following information related to a user. One or more user groups "UG" 700f are recorded that match the user's characteristics according to corresponding rules, which is determined by a user grouping module 700b, e.g. in the manner described above for action 202 and/or for the user grouping module 100b of FIG. 1. A corresponding relevance weight may also be recorded for the user group(s) 700f as described above.

The user profile 700a also contains information about the user's service usage 700g which information may be used by the user grouping module 700b for determining or updating the user's group memberships. Other information about the user 700h such as demographics, profession, residence location, etc., is also maintained in the user profile 700a which is likewise used by the user grouping module 700b for determining or updating the user's group memberships. The current perception score P determined by one or more scoring modules 700e may also be recorded in the user profile.

The score management node 700 further comprises a parameter module 700d which sets the user-specific model parameters MP based on the defined user profile UP, e.g. in the manner described above for action 204. 700c denotes a storage that holds predefined user groups and corresponding rules which can be accessed by the user grouping module 100b. Further, 700i denotes a storage that holds predefined model parameters valid for the predefined user groups which can be accessed by the parameter module 700d. The information in storages 700c and 700i may alternatively be maintained in a common storage, not shown, thus holding both the predefined user groups and their predefined model parameters.

Figure 8:
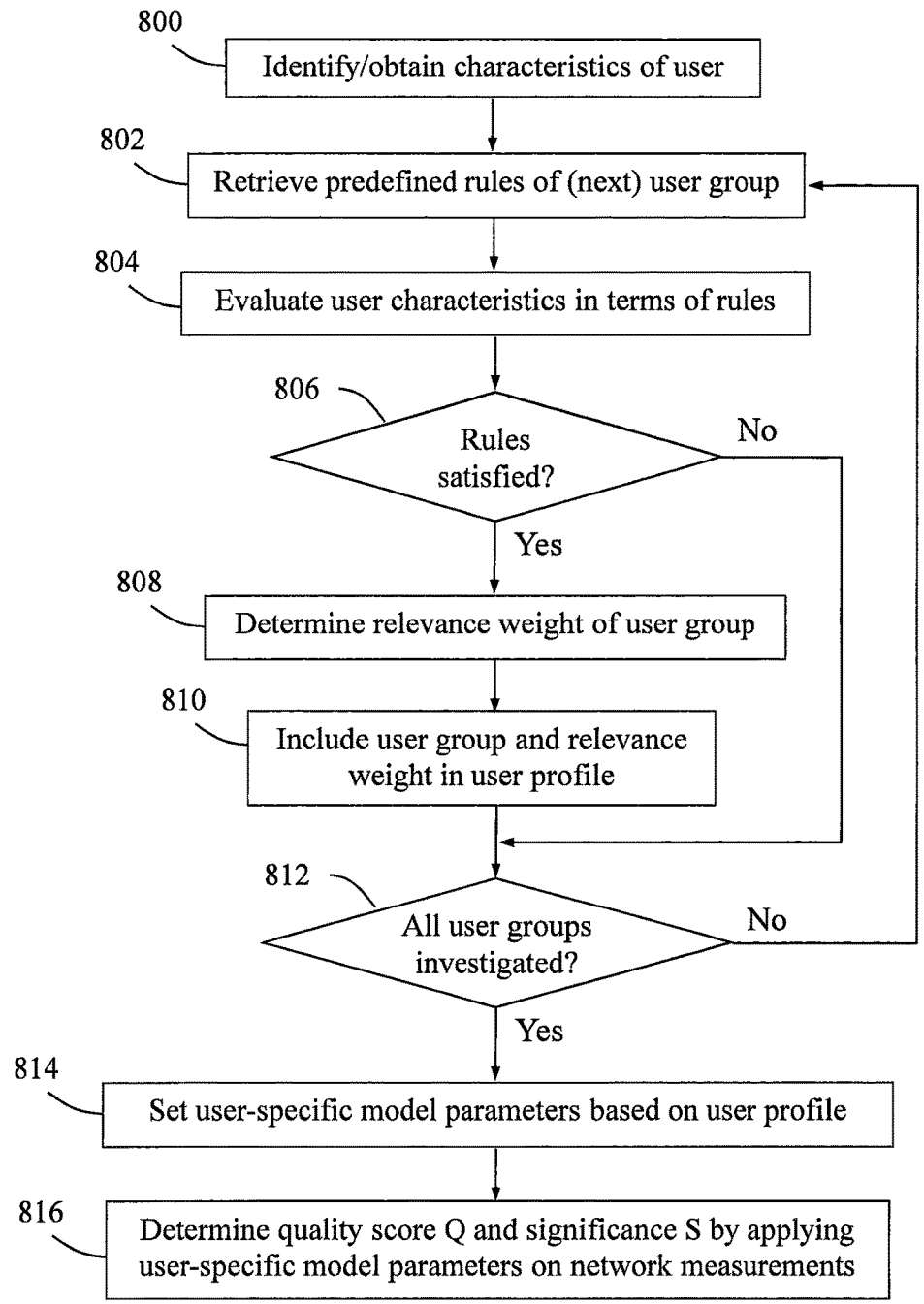
FIG. 8 is a flow chart illustrating an example of a more detailed procedure in a score management node, according to further possible embodiments.

A more detailed example of a procedure in a score management node will now be described with reference to the flow chart in FIG. 8, which illustrates specifically how the score management node can determine and use a user profile of a user. In a first shown action 800, the score management node identifies or obtains the user's characteristics, basically as described above for action 200. In a next action 802, the score management node retrieves predefined rules of a first predefined user group, e.g. from the storage 700c shown in FIG. 7. The score management node then evaluates the user's characteristics in terms of the retrieved rules of the first predefined user group, in an action 804, i.e. to determine whether this group is relevant for the user or not. Another action 806 thus indicates that the score management node determines whether the user's characteristics satisfies the rules or not. If so, the score management node proceeds to determine a relevance weight of the first user group, in an action 808, which operation has been described above e.g. for FIGS. 3-5.

Then the score management node includes or records the user group and corresponding relevance weight in the user profile, as shown in an action 810. A following action 812 is a check if all predefined user groups have been investigated. If not, the score management node returns to action 802 for investigating a next predefined user group in the manner described for actions 802-810. If it is found in action 806 that the rules of an investigated predefined user group are not satisfied by the user's characteristics, this user group is not included in the user profile and the procedure can move directly to action 812 by skipping actions 808 and 810.

In this way the user profile can be built up by investigating all the predefined user groups for inclusion or not. When it is found in action 812 that all predefined user groups have been investigated by performing actions 802-810 for each user group, the user profile is completed and the score management node proceeds to set user-specific model parameters based on the generated user profile, as shown in an action 814, which operation has been described above for action 204. It should be noted that actions 802-812 basically corresponds to action 202 described above. Finally, in an action 816, the score management node determines the quality score Q and associated significance S by applying the user-specific model parameters on each received network measurement, which operation has been described above for action 208. After this procedure, actions 210 and 212 are also performed in the manner described above which will not be repeated here.

While the solution has been described with reference to specific exemplifying embodiments, the description is generally only intended to illustrate the inventive concept and should not be taken as limiting the scope of the solution. For example, the terms "score management node", "perception score P", "quality score", "significance", "user profile", "user characteristics", "model parameters", "scoring module", "user grouping module", and "parameter module" have been used throughout this disclosure, although any other corresponding entities, functions, and/or parameters could also be used having the features and characteristics described here. The solution is defined by the appended claims.

The invention claimed is:

1. A method performed by a score management node for supporting service evaluation by obtaining a perception score P for a user, the perception score P reflecting the user's experience of a service delivered by means of a telecommunication network, the score management node comprising a processor and memory, wherein the memory comprises instructions executable by the processor, and wherein the instructions, when executed by the processor, cause the processor to perform the steps of the method, the method comprising:

identifying characteristics of the user,
defining a user profile for the user, the user profile comprising at least one predefined user group that matches the identified user characteristics,
setting user-specific model parameters based on the defined user profile, wherein the user-specific model parameters are valid for the at least one predefined user group in the user profile,
receiving network measurements related to service events when the service is delivered to the user,
determining, for each network measurement, a quality score Q reflecting the user's perception of quality of service delivery and an associated significance S reflecting the user's perception of importance of the service delivery, by applying the user-specific model parameters on each network measurement, calculating the perception score P in real-time, based on the quality scores Q and the associated significances S, and transmitting, to a service evaluation system, the calculated perception score P, wherein the calculated perception score P is used by the service evaluation system in the service evaluation, wherein the calculated perception score P is used to identify one or more network measurements, among the network measurements, which affect the quality of service delivery, wherein the identified one or more network measurements are used to eliminate or repair a technical issue for improvement of the service delivered to the user, wherein the calculated perception score P is a user-specific perception score, which indicates an experience of the user in view of the delivered service in the real-time, wherein the calculation of the perception score P to evaluate the experience of the user takes less time as compared to evaluating the experience of the user with manual intervention, wherein the score management node determines multiple pairs of the quality score Q and the associated significance S for the respective service events based on the network measurements, and wherein the calculation of the perception score P includes averaging the quality scores Q for the service events weighted by their associated significances S.

2. The method according to claim 1, wherein the user profile comprises at least two predefined user groups, and wherein the score management node sets the user-specific model parameters by combining predefined model parameters of each user group of the at least two predefined user groups in the user profile.

3. The method according to claim 1, wherein the score management node calculates perception score $P_N$ for N network measurements as $$P_N = \frac{\sum_{n=1}^{N} Q_n S_n}{\sum_{n=1}^{N} S_n}$$

where $Q_n$ is the quality score for each network measurement n and $S_n$ is the associated significance for said network measurement n.

4. The method according to claim 1, wherein the score management node further identifies the at least one predefined user group that matches the identified user characteristics when the user characteristics satisfy one or more rules defined for the at least one predefined user group.

5. The method according to claim 4, wherein the one or more rules of each user group of the at least one predefined user group dictate that the user characteristics must satisfy one or more predefined threshold conditions in order to include said user group in the user profile.

6. The method according to claim 4, wherein the one or more rules are related to at least one of:
demographical factors,
the user's profession,
a location of the user's residence,
a location of the user's working site, and
the user's previous service usage.

7. The method according to claim 1, wherein the score management node further: includes multiple user groups that match the identified user characteristics in the user profile, determines a partial perception score P for each user group of the multiple user groups separately, and determines a total perception score P by applying a respective relevance weight on each determined partial perception score P, and wherein the relevance weight of each user group in the user profile is dependent on how relevant the user group is for the user.

8. The method according to claim 1, wherein the score management node further: includes multiple user groups that match the identified user characteristics in the user profile, determines a group-specific quality score Q and an associated significance S for each user group of the multiple user groups separately, and determines a total quality score Q and an associated significance S by applying a respective relevance weight on each determined group-specific quality score Q and the associated significance S, and wherein the relevance weight of each user group in the user profile is dependent on how relevant the user group is for the user.

9. The method according to claim 7, wherein the score management node determines the relevance weight for each user group in the user profile based on the user's previous service usage in relation to said user group.

10. The method according to claim 1, wherein the network measurements are related to any of: a time needed to download data, a time from a service request until delivery, call drop rate, data rate, and data error rate.

11. The method according to claim 1, wherein the score management node receives the network measurements in a message according to Hyper-Text Transfer Protocol (HTTP) or File Transfer Protocol (FTP).

12. A score management node arranged to support service evaluation by obtaining a perception score P for a user, the perception score P reflecting the user's experience of a service delivered by means of a telecommunication network, the score management node comprising a processor and memory, wherein the memory comprises instructions executable by the processor, whereby the score management node is configured to:
identify characteristics of the user,
define a user profile for the user, the user profile comprising at least one predefined user group that matches the identified user characteristics,
set user-specific model parameters based on the defined user profile, wherein the user-specific model parameters are valid for the at least one predefined user group in the user profile,
receive network measurements related to service events when the service is delivered to the user,
determine, for each network measurement, a quality score Q reflecting the user's perception of quality of service delivery and an associated significance S reflecting the user's perception of importance of the service delivery, by applying the user-specific model parameters on each network measurement,
calculate the perception score P in real-time, based on the quality scores Q and the associated significances S, and
transmit, to a service evaluation system, the calculated perception score P, wherein the calculated perception score P is used by the service evaluation system in the service evaluation, wherein the calculated perception score P is used to identify one or more network measurements, among the network measurements, which affect the quality of service delivery, wherein the identified one or more network measurements are used to eliminate or repair a technical issue for improvement of the service delivered to the user, wherein the calculated perception score P is a user-specific perception score, which indicates an experience of the user in view of the delivered service in the real-time, wherein the calculation of the perception score P to evaluate the experience of the user takes less time as compared to evaluating the experience of the user with manual intervention, wherein the score management node is further configured to determine multiple pairs of the quality score Q and the associated significance S for the respective service events based on the network measurements, and wherein the calculation of the perception score P includes averaging the quality scores Q for the service events weighted by their associated significances S.

13. The score management node according to claim 12, wherein the user profile comprises at least two predefined user groups, and wherein the score management node is configured to set the user-specific model parameters by combining predefined model parameters of each user group of the at least two predefined user groups in the user profile.

14. The score management node according to claim 12, wherein the score management node is configured to calculate perception score $P_N$ for N network measurements as $$P_N = \frac{\sum_{n=1}^{N} Q_n S_n}{\sum_{n=1}^{N} S_n}$$

where $Q_n$ is the quality score for each network measurement n and $S_n$ is the associated significance for said network measurement n.

15. The score management node according to claim 12, wherein the score management node is further configured to identify the at least one predefined user group that matches the identified user characteristics when the user characteristics satisfy one or more rules defined for the at least one predefined user group.

16. The score management node according to claim 15, wherein the one or more rules of each user group of the at least one predefined user group dictate that the user characteristics must satisfy one or more predefined threshold conditions in order to include said user group in the user profile.

17. The score management node according to claim 15, wherein the one or more rules are related to at least one of:
demographical factors,
the user's profession,
a location of the user's residence,
a location of the user's working site, and
the user's previous service usage.

18. The score management node according to claim 12, wherein the score management node is further configured to: include multiple user groups that match the identified user characteristics in the user profile, determine a partial perception score P for each user group of the multiple user groups separately, and determine a total perception score P by applying a respective relevance weight on each determined partial perception score P, and wherein the relevance weight of each user group in the user profile is dependent on how relevant the user group is for the user.

19. The score management node according to claim 12, wherein the score management node is further configured to: include multiple user groups that match the identified user characteristics in the user profile, determine a group-specific quality score Q and an associated significance S for each user group of the multiple user groups separately, and determine a total quality score Q and associated significance S by applying a respective relevance weight on each determined group-specific quality score Q and the associated significance S, and wherein the relevance weight of each user group in the user profile is dependent on how relevant the user group is for the user.

20. The score management node according to claim 18, wherein the score management node is further configured to determine the relevance weight for each user group of the multiple user groups in the user profile based on the user's previous service usage in relation to said user group.

21. The score management node according to claim 12, wherein the network measurements are related to any of: a time needed to download data, a time from a service request until delivery, call drop rate, data rate, and data error rate.

22. The score management node according to claim 12, wherein the score management node is configured to receive the network measurements in a message according to Hyper-Text Transfer Protocol (HTTP) or File Transfer Protocol (FTP).

23. A computer program storage product comprising instructions which, when executed on at least one processor, cause the at least one processor to carry out the method according to claim 1.

24. The score management node according to claim 12, wherein the score management node is further configured to:
identify the technical issue with the service delivered to the user, based on the calculated perception score P of different types of service events, and
repair the identified technical issue.

* * * * *